United States Patent [19]

Hatta et al.

[11] Patent Number: 4,737,327

[45] Date of Patent: Apr. 12, 1988

[54] PROCESS FOR PRODUCING SILICON CARBIDE SINTERED PRODUCT

[75] Inventors: Tokuaki Hatta; Hiroshi Onda, both of Kitakyushu, Japan

[73] Assignee: Kurosaki Refractories Co., Ltd., Fukoka, Japan

[21] Appl. No.: 941,853

[22] Filed: Dec. 15, 1986

Related U.S. Application Data

[63] Continuation-in-part of Ser. No. 709,693, Feb. 28, 1985, abandoned.

[30] Foreign Application Priority Data

Feb. 7, 1983 [JP] Japan ............................ 58-120766
Jul. 2, 1984 [WO] PCT Int'l Appl. .................... 00341

[51] Int. Cl.$^4$ ............................................. C04B 35/56
[52] U.S. Cl. ........................................ 264/60; 264/63
[58] Field of Search .................................. 264/60, 63

[56] References Cited

U.S. PATENT DOCUMENTS

| | | | |
|---|---|---|---|
| 2,938,807 | 5/1960 | Anderson | 264/63 |
| 4,117,057 | 9/1978 | Yajima et al. | 264/63 |
| 4,374,793 | 2/1983 | Koga et al. | 264/65 |

FOREIGN PATENT DOCUMENTS

| | | |
|---|---|---|
| 1083789 | 8/1980 | Canada . |
| 52-154816 | 12/1977 | Japan . |
| 54-3815 | 4/1979 | Japan . |
| 1561653 | 2/1980 | United Kingdom . |
| 2104103 | 3/1983 | United Kingdom . |

Primary Examiner—James Derrington
Attorney, Agent, or Firm—James J. Ralabate

[57] ABSTRACT

A process for producing a silicon carbide sintered product, particularly, large-shaped silicon carbide sintered product by reaction sintering. Siliciding reaction can be carried out completely in a short period of time by adding an organic silicon polymer whose skelton is composed of silicon and carbon to the starting sintering material and using the same for the control of the reaction rate.

2 Claims, No Drawings

PROCESS FOR PRODUCING SILICON CARBIDE SINTERED PRODUCT

This application is a Continuation-in-Part of Parent Application Ser. No. 06/709,693, filed Feb. 28, 1985, now abandoned.

TECHNICAL FIELD

This invention relates to a process for producing silicon carbide sintered products, particularly, large-shaped composite silicon carbide sintered products by reaction sintering.

BACKGROUND OF THE INVENTION

Manufacturing of silicon carbide sintered products by the reaction sintering process, which comprises impregnating molten or gaseous silicon into a molded body consisting of powdery silicon carbide, carbon powder, carbon-forming resin, binder and the like, siliciding carbon to form silicon carbide and bonding silicon carbide as the starting material thereto, can be carried out during the temperature range from 1410° to 1700° C. that is lower than the sintering temperature of 1900° to 2300° C. as applied to the hot-press process and the atmospheric sintering process, and therefore, little dimensional change is recognized during the sintering and it is now becoming noticeable as a suitable process to manufacture large-sized sintered products with complicated configuration.

However, during said conventional reaction sintering process, a portion of the powder molded body is in contact with molten silicon and silicon is taken into the molded body by way of the capillary phenomenon of the molten silicon. Accordingly, an extremely long period of time has been necessary for siliciding large-sized molded bodies such as elongate and thick-walled products and it has been considered to be impossible to apply the reaction sintering method to the production of large-sized molded bodies with industrially economical advantage from the point of restriction of the length and the thickness.

Furthermore, in said conventional reaction sintering, when the molten silicon intrudes into the molded body and contacts the carbon, the reaction is taken place almost simultaneously to produce silicon carbide in a volume of about 2.4 times of the carbon, by which the intruding path of the molten silicon is narrowed to hinder the further intrusion of silicon into the molded body. Accordingly, there has been a problem in that carbon is remained unreacted in the sintered product to cause reduction in the strength of the final product or that cracking is resulted due to the irregularity of the siliciding reaction.

The object of this invention is to overcome the problems in said conventional reaction sintering method and provide a process for producing a large-sized sintered product causing neither the reduction in the strength of nor cracks in the final product by a reaction sintering method in a short time and with an economical advantage.

DISCLOSURE OF THE INVENTION

This invention is based on the findings in the process for producing a silicon carbide sintered product by the reaction sintering that siliciding reaction can be carried out completely in a short time by adding an organic silicon polymer whose skelton is mainly composed of silicon and carbon to the starting sintering material and using the same for the control of the reaction rate.

Although the use of the organic silicon polymer for the sintering of SiC has been disclosed already, for example, in Japanese Patent Laid-Open Nos. 40509/1977, 154816/1977, 94314/1978, 3815/1979 and 32070/1983 and Japanese Patent Publication No. 38548/1982, the use of the organic silicon polymer for the control of the reaction rate upon reaction sintering of silicon carbide as in this invention is novel by itself.

In this invention, an organic silicon polymer is previously mixed with starting sintering material comprising SiC powder, cabon powder, resin binder and the like.

The organic silicon polymer referred to herein includes those high molecular organic silicon compounds whose skelton is mainly composed of silicon and carbon, whose side chains are decomposed almost entirely up to about 800° C. to form nearly amorphous continous structure mainly composed of Si-C bonds and which comprise mainly fine $\beta$-SiC at a temperature more than 1000° C. that can be observed through X-ray diffraction.

If the molecular weight of the organic silicon polymer is excessively low, the polymer will evaporate in a great amount upon decomposition and, while on the other hand, if it is too large, the polymer contains macro-molecules therein to worsen the uniform dispersibility. Accordingly, a desired number average molecular weight is from 1000 to 10000.

The organic silicon polymer is dissolved in hexane, xylene or THF, mixed with a mixture of SiC powder, carbon powder, resin and the like and pulverized after the removal of the solvent, to thereby obtain powdery secondary particles bonded and coated with the organic silicon polymer.

It is also effective to coat the surface of the secondary particles not admixed with organic silicon polymer with the organic silicon polymer.

The organic silicon polymer can be admixed in any of the following modes:

(1) the state where all of the starting particles are coated and bonded with the organic silicon polymer, (2) the state in which the surface of the starting particles bonded with resin or the like is coated with the organic silicon polymer, (3) the state where the molding agent is added simultaneously, and (4) the state where only the surface of the starting carbon is previously coated with the organic silicon polymer.

However, since the organic silicon polymer serves to control the siliciding reaction, the addition mode in (4) is optimal, in which the precise control is possible for the amount of the organic silicon polymer covering the surface of the carbon powder and the amount of the relatively expensive organic silicon polymer used can be minimized.

If the addition amount of the organic silicon polymer is insufficient, control for the siliciding reaction is insufficient to cause crazing or cracking in the sintered product. On the other hand, if it is in excess, the reaction control effect is too strong resulting in the structure where unreacted portions are left. Thus, in view of the effectiveness of the addition, economical factor and the productivity, the addition amount of the organic silicon polymer is preferably less than 50 parts by weight based on 100 parts by weight of the starting material. The starting carbon with a fine coating film consisting of β-SiC through the heat treatment, effectively contributes to the control of the siliciding reaction rate. The thickness of such polymer coating film can be varied depending on the surface area of the primary and secondary praticles and the amount of the organic silicon polymer to be mixed.

By forming the ultrafine particulate β-SiC coating film mainly on the surface of the secondary carbon particles in the molded body, the reaction accompanying the abrupt heat generation and expansion between carbon and silicon can optionally be controlled.

Accordingly, since the leaching of the carbon is reduced and the reaction is proceeded gradually, a rapid exothermic reaction is controlled, an appropriate gaps can be secured and the expansive destruction due to the silicidation can be avoided.

Further, since β-SiC decomposed from the organic silicon polymer provides a bonding force between SiC in the aggregate, the molded body is less destructive thereby enabling immersion silicidation of the molded body.

The thus obtained powdery product is molded to obtain a shaped body by using a cold isostatic press molding, die press molding, extrusion molding, injection molding and the like.

In the case of carrying out injection molding, for instance, the SiC powder and the carbon powder are solidified with carbon-forming resin and pulverized to form the coating film of the organic silicon polymer on the surface of particles, which is used as the starting material. Then, the thermoplastic resin such as polystyrene, polyethylene, atactic polypropylene and the like and plasticizer such as paraffin, resin acid ester, diethyl phthalate or dibutyl phthalate are mixed therewith which is then molded.

After degreasing, the molded body is immersed in a molten silicon at a temperature higher than 1410° C. and under the reduced pressure of less than 1 mmHg and silicided. After the completion of the silicidation, the sintered product is taken out from the molten silicon and then cooled.

Upon said silicidation, although molten silicon rapidly intrudes into pores of the sintered product, since the silicidation proceeds gradually, the temperature of the silicides is not so elevated as compared with the temperature for the molten silicon. And the time required for the silicidation undergoes no substantial effect from the shape and the size since the entire molded body is silicided through immersion, but it depends on the wall thickness thereof, porosity of the molded body upon silicidation, grain size distribution of the aggregate SiC and the amount of carbon mixed.

Accordingly, a uniform sintering product can be obtained in an extremely short time even in the case of the large-sized product by properly setting the above-mentioned conditions. For example, the time required for siliciding a molded body of 10 mm in wall thickness is within one hour irrespective of the size.

A purpose of the present invention is to provide a method of producing a large-sized silicon carbide sintered product without any failure such as the causing of cracks and reduction of strength by employing a reaction sintering process. Such purpose can be achieved by the claimed invention economically on an industrial scale.

A first main characteristic of the present invention is to employ a secondary particle from silicon carbide powder, carbon powder and a resin powder with which an organic silicon polymer is mixed. By employing of the secondary particles for constituting the molded powder, an organic silicon polymer that is admixed thereafter and coated thereon, can be easily impregnated into the secondary particles and the reaction sintering is promoted throughout the shaped article even though it is large-sized.

The second characteristic is to employ an organic silicon polymer together with a solvent that does not dissolve a resin constituting the second particles such as tetrahydrofuran, xylene, and hexane, whereby the secondary particles are not destroyed.

This invention relates to a process for producing a silicon carbide sintered product comprising the following steps: (a) preparing secondary particles by drying and pulverizing slurry mixture of silicon carbide powder, carbon powder and a resin binder, and (b) admixing thus prepared secondary particles of 100 parts by weight with an organic silicon polymer and with a solvent which does not dissolve said resin constituting the second particles of less than 50 parts by weight whose skeleton composed of silicon and carbon to coat said secondary particles with the organic silicon polymer, (c) molding thus coated secondary particles to an article and (d) then subjecting the molded article to reaction sintering in a molten silicon bath.

BEST MODE FOR CARRYING OUT THE INVENTION

Specific method and effect of this invention will now be described referring to examples.

EXAMPLE 1

To 100 parts by weight of commercially available SiC powder: GC#2000, were added 50 parts by weight of carbon black, 15 parts by weight of novolac type phenol resin and one part by weight of hexamethylenetetramine as the hardening promotor. They were mixed in acetone using a ball mill and the obtained slurry was dried and pulverized to obtain secondary particles with less than 44μ in size.

After admixing 8 parts by weight of polycarbosilane dissolved in xylene with 100 parts by weight of the secondary particles, they were dried under vacuum heating at 70° C. to remove xylene, pulverized and then passed through a 74μ sieve.

The thus obtained powder was subjected to isostatic pressure under a pressure of 1200 kg/cm$^2$ to obtain a molded body of 25×100×100 mm in size.

After immersing the molded body in molten silicon at 1470° C. and under the reduced pressure of 1 mmHg, it was held at 1550° C. for one hour and aged.

The sintered product thus obtained was uniformly silicided and had a bulk density of 3.12 g/cm$^3$ and an average three point bending strength at room temperature of 58 kg/mm$^2$.

COMPARATIVE EXAMPLE 1

To 100 parts by weight of commercially available SiC powder: GC#2000, were added 45 parts by weight of carbon black, 15 parts by weight of novolac type phenol resin and one part by weight of hexamethylenetetramine as the hardening promotor. Then, they were mixed in ethanol by using a ball mill, dried and pulverized and, thereafter, molded and sintered in the same manner as in Example 1. A number of cracks and crazing were developed in the sintered product obtained in this way.

EXAMPLE 2

The sintered product obtained in the same manner as in Example 1 was subjected to isostatic press to obtain a cylindrical molded body of 40 mm φ (inner diameter) ×50 mm φ (outer diameter) ×1 m (length). The molded body was subjected to silicidation through immersion for 20 min. under the same conditions as in Example 1.

The thus obtained sintered product was homogenously silicided and had a bulk density of 3.10 g/cm$^3$ and an average three point-bending strength at room temperature of 56 kg/mm$^2$.

EXAMPLE 3

To secondary particles obtained in the same manner as in Example 1, 0.5-60 parts by weight of polycarbosilane were admixed, dried and pulverized.

The thus obtained powder was subjected to isostatic press under a pressure of 1200 kg/cm$^2$ to obtain a molded body of 10×20×50 mm in size. The molded body was subjected to reaction sintering under the same conditions as in Example 1. The appearance, the bulk density and the average three point-bending strength of the sintered product are shown in Table 1.

TABLE 1

| No. | Addition amount of organic silicon polymer (parts by weight) | Appearance | Bulk density (g/cm$^3$) | Average three point-bending strength (kg/mm$^2$) |
| --- | --- | --- | --- | --- |
| 1 | 0 | destructed (crack occurred entirely) | — | — |
| 2 | 0.05 | crazing at the surface | 3.07 | 41 |
| 3 | 0.1 | good | 3.09 | 47 |
| 4 | 0.5 | good | 3.10 | 54 |
| 5 | 1.0 | good | 3.12 | 58 |
| 6 | 3 | good | 3.11 | 57 |
| 7 | 5 | good | 3.10 | 55 |
| 8 | 10 | good | 3.08 | 55 |
| 9 | 30 | good | 3.04 | 49 |
| 10 | 50 | residual carbon present | 2.97 | 38 |

EXAMPLE 4

The powder prepared by adding to commercially available SiC powder: GC#2000, 15% by weight of powder which had been obtained by covering the surface of commercially available graphite powder of 10μ in average particle size with 5 % by weight of an organic silicon polymer and 20 % by weight of carbon-forming organic binder was wet mixed in acetone and dried. The powder obtained after drying was subjected to isostatic press under the pressure of 1.5 ton/cm$^2$ to obtain a molded body of 60×25×30 mm in size.

The thus obtained molded body was kept at 1000° C. under vacuum for 6 hours to remove binder and apply carbonization prior to the silicidation.

The sample obtained in this way was immersed in molten silicon under vacuum at 1420° C. After kept at that temperature for one hour, the temperature was elevated up to 1550° C. in the immersed state and the sample was pulled up after being maintained for 2 hours.

As a result, a uniform sample having a bulk density of 3.12 g/cm$^3$ was obtained, which has a three pointbending strength at room temperature of 58 kg/cm$^3$.

What is claimed:

1. A process for producing a silicon carbide sintered product comprising the steps of preparing secondary particles by drying and pulverizing slurry mixture of silicon carbide powder, carbon powder and a resin binder, admixing a solvent and up to 50 parts by weight of an organic silicon polymer with about 100 parts by weight of said secondary particles, thereby coating said secondary particles with said organic silicon polymer, said resin binder being insoluble in said solvent and said organic silicon polymer having a skeleton composed of silicon and carbon, molding thus coated secondary particles to an article and then subjecting the molded article to reaction sintering.

2. A process for producing a silicon carbide sintered product comprising the steps of preparing secondary particles by drying and pulverizing a slurry mixture of silicon carbide powder, carbon powder and a resin binder, admixing a solvent and up to 50 parts by weight of an organic silicon polymer with 100 parts by weight of said secondary particles, thereby coating said secondary particles with said organic silicon polymer, said resin binder being insoluble in said solvent and said organic silicon polymer having a skeleton comprised of silicon and carbon, molding the thus coated secondary particles to an article and then subjecting the molded article to reaction sintering in a molten silicon bath.

* * * * *